(12) United States Patent
Chen (10) Patent No.: US 8,276,163 B2
(45) Date of Patent: Sep. 25, 2012

(54) PORTABLE ELECTRONIC DEVICE AND METHOD FOR SCHEDULING SESSIONS

(75) Inventor: Wei-Chih Chen, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 773 days.

(21) Appl. No.: 12/414,622

(22) Filed: Mar. 30, 2009

(65) Prior Publication Data

US 2010/0011378 A1    Jan. 14, 2010

(30) Foreign Application Priority Data

Jul. 11, 2008   (CN) .......................... 2008 1 0302694

(51) Int. Cl.
*G06F 3/00* (2006.01)
*G06F 15/16* (2006.01)

(52) U.S. Cl. ........................ 719/321; 709/228

(58) Field of Classification Search ................. 719/318, 719/321; 714/799; 709/228
See application file for complete search history.

(56) References Cited

U.S. PATENT DOCUMENTS

| 7,439,937 | B2 * | 10/2008 | Ben-Shachar et al. ......... 345/1.1 |
| 7,590,986 | B1 * | 9/2009 | Doraisamy et al. ........... 719/321 |
| 7,774,356 | B2 * | 8/2010 | Cui .............................. 707/769 |
| 2006/0075106 | A1 * | 4/2006 | Hochmuth et al. ........... 709/227 |
| 2007/0088830 | A1 * | 4/2007 | Borella ......................... 709/227 |

OTHER PUBLICATIONS

L.Zaccheo, Santin Multicast/Broadcast oriented Architecture and S/T-umts terminal and Network Level Intergration, 2002.*

* cited by examiner

*Primary Examiner* — Lechi Truong
(74) *Attorney, Agent, or Firm* — Altis Law Group, Inc.

(57) ABSTRACT

A portable electronic device and method for scheduling sessions in a portable electronic device is provided. The device provides a session manager. The session manager provides different types of sessions between multimedia services and multimedia drivers in the device. Each session comprises one or more statuses directed at controlling allotment of the multimedia services to applications. The session manager coordinates the statuses of the sessions if a service has modified a status of a corresponding session. The session manager provides callbacks to notify a corresponding service when a status of the corresponding session has been coordinated.

7 Claims, 9 Drawing Sheets

| Session \ Session | Audio | Speech | Radio | Tone | Voice |
|---|---|---|---|---|---|
| Audio | Exclusive | Exclusive | Exclusive | Coexistent | Exclusive |
| Speech | Exclusive | Exclusive | Exclusive | Coexistent | Exclusive |
| Radio | Exclusive | Exclusive | Exclusive | Exclusive | Exclusive |
| Tone | Coexistent | Coexistent | Exclusive | Exclusive | Exclusive |
| Voice | Exclusive | Exclusive | Exclusive | Exclusive | Exclusive |

PORTABLE ELECTRONIC DEVICE AND METHOD FOR SCHEDULING SESSIONS

BACKGROUND

1. Technical Field

Embodiments of the present disclosure relate to the field of sessions management technology, and more particularly to a portable electronic device and method for scheduling sessions of a portable electronic device.

2. Description of Related Art

Portable electronic devices are being used increasingly in everyday life. The rapid acceptance and growth of packet-based networks has led to the development of numerous resource services, which are beneficial in both residential and business contexts. These resource services include application sharing, video conferencing, media streaming, gaming, and the like provided during session on the portable electronic devices. Unfortunately, it is often difficult for a file manager to adequately control the sessions or the many possible services associated with the sessions.

Therefore, there is a need for an efficient and effective technique for automatically associating different sessions with different resource services.

DETAILED DESCRIPTION

Figure 1:
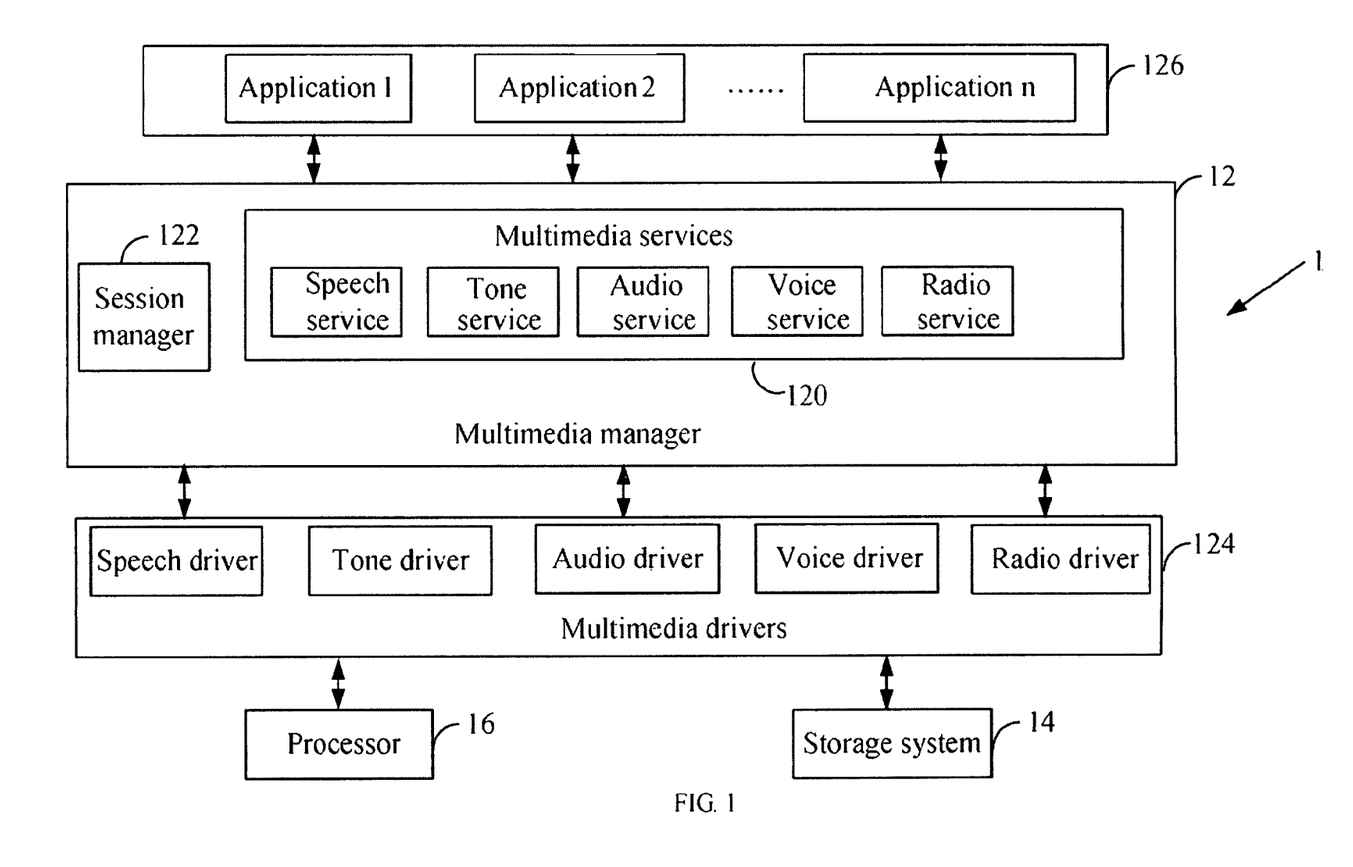
FIG. 1 is a block diagram of one embodiment of a portable electronic device.

FIG. 1 is a block diagram of one embodiment of a portable electronic device 1. The device 1 may be a portable wireless device, such as a mobile telephone, a personal digital assistant (PDA), and the like.

In the embodiment, the device 1 includes multiple multimedia drivers 124, a multimedia manager 12, and multiple applications 126. The drivers 124 may include a radio driver, a voice driver, an audio driver, a tone driver, and a speech driver. The drivers 124 are used to serve the applications 126.

The multimedia manager 12 is an interface layer between the drivers 124 and the applications 126. The manager 12 includes a session manager 122, and multiple multimedia services 120. The services 120 include a speech service, a tone service, an audio service, a voice service, and a radio service. Each of the services 120 may serve one or more of the applications 126. The device 1 further includes at least one processor 16 for controlling the session manager 122 for scheduling sessions, and a storage system 14 for storing session data during the scheduling process.

Figure 2:
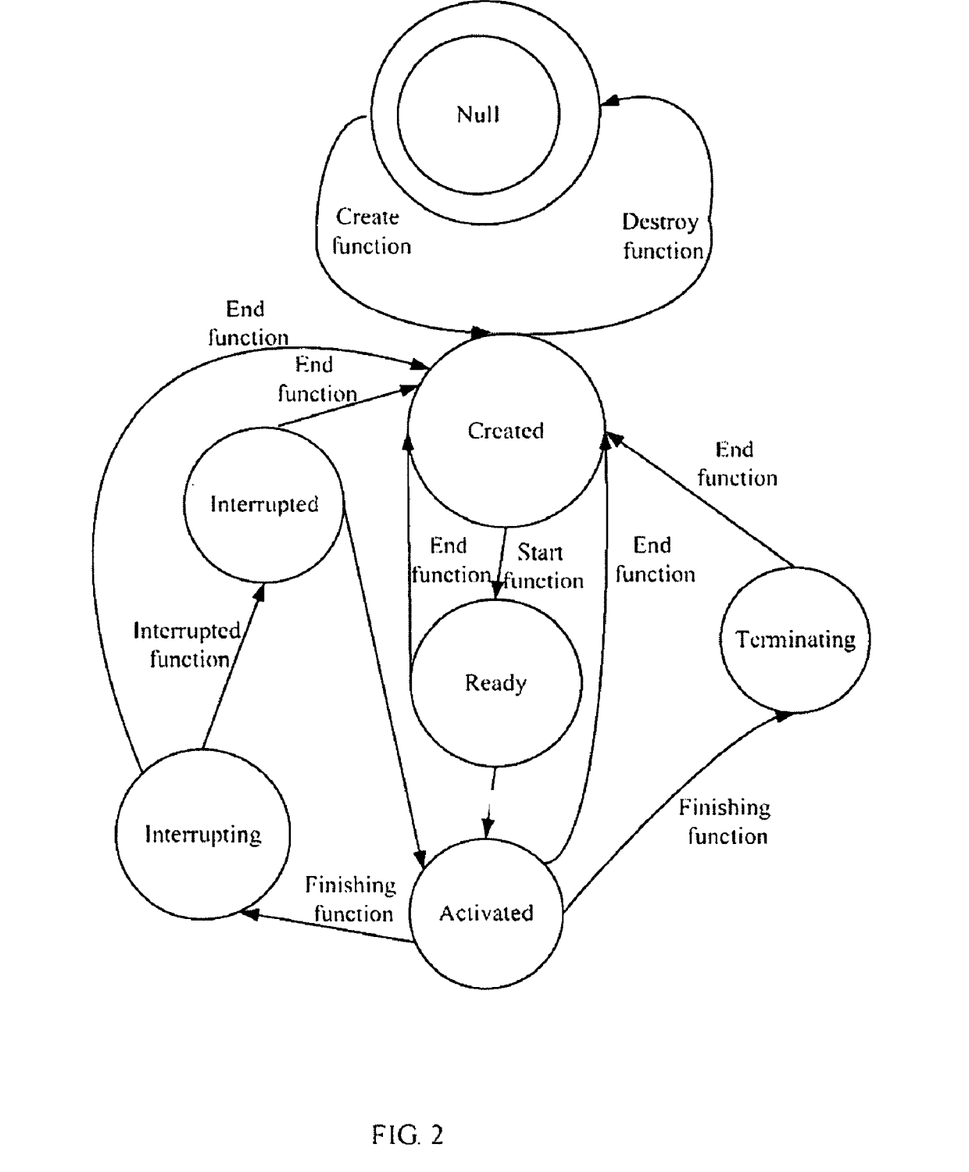
FIG. 2 is a diagram illustrating a session lifetime in the device of FIG. 1.

The session manager 122 provides different types of sessions to serve the services 120, and manages and modifies status of the sessions. The session manager 122 is used to coordinate and schedule the sessions according to the statuses of the sessions. In order to facilitate the understanding of the embodiment, a session is defined as a period of time during which an application may use a service 120, and the length of such time is known as a session lifetime. A session may have several statuses in its lifetime, directed at controlling allotment of the services 120 to applications during its lifetime. Referring to FIG. 2, the statuses of a session may include: a Null status, a Created status, an Activated status, a Ready status, a Terminating status, an Interrupting status, and an Interrupted status. Referring to FIG. 2, the session manager 122 also provides functions that can be called by the services 120 to change the status of the sessions. The session manager 122 provides callbacks to notify the corresponding service 120 when the session manager 122 has modified the status of the session currently associated with one or more service(s) in some manner. Each of the callbacks is a set sequence of steps or a part of larger computer program. The callbacks provided by the session manager 122 may include: a Reject callback, a Grant callback, a Resume callback, a Terminate callback, and an Interrupt callback. The session manager 122 is used for changing the allotment of the services 120 according to status of current sessions. Therefore, a session may be defined by the following properties: a session type, an identification (id), a priority, a status, a callback, and a pointer.

FIG. 2 is a diagram illustrating a session lifetime in the device 1 of FIG. 1. The Null status denotes that a session has not begun with one of the services 120. The Created status denotes that a session has begun with one of the services 120, but no driver 124 is active yet. The Ready status denotes that a session has requested to use a corresponding driver from the drivers 124 and the session manager 122 has no response to the request. The Activated status denotes that a session has begun with one of the drivers 124. The Terminating status denotes that a session is beginning to release one of the drivers 124 or is required to release one of the drivers 124. The Interrupting status denotes that a session is required to temporarily release one of the drivers 124. The Interrupted status denotes that a session has temporarily released one of the drivers 124 and is waiting for notification from the session manager 122.

Each of the functions provided by the session manager 122 is a set sequence of steps or a part of larger computer program and can be called by the services 120 to change the status of the sessions. The functions may include: a Create function, a Destroy function, a Start function, an End function, an Interrupted function, and a Finishing function. The Create function is used for changing the status of a session from the Null status to the Created status. The Destroy function is used for changing the status of a session from the Created status to the Null status. The Start function is used for changing the status of a session from the Created status to the Ready status. The End function is used for changing the status of a session from any of the Ready status, the Activated status, the Terminating status, the Interrupting status, and the Interrupted status to the Created status. The Interrupted function is used for changing the status of a session from the Interrupting status to the Interrupted status. The Finishing function is used for changing the status of a session from the Activated status to the Terminating status or the Interrupting status.

The sessions in the Ready status are stored in a Ready stack. The sessions in the Interrupted status are stored in an Interrupted stack. The sessions in the Null status are stored in a Null queue. The sessions in the Created status are stored in a Created queue. The sessions in the Activated status are stored in an Activated queue. The sessions in the Terminating status are stored in a Terminating queue. The sessions in the Interrupting status are stored in an Interrupting queue.

Figure 3:
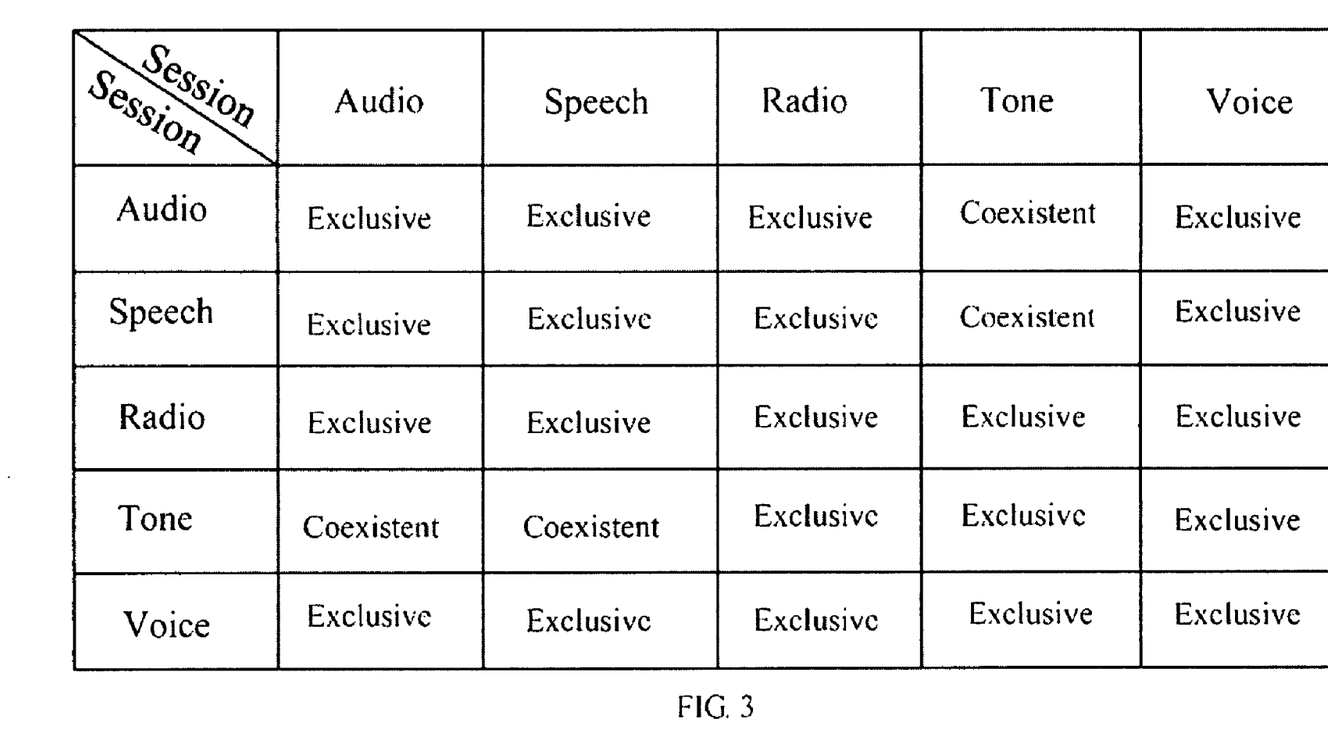
FIG. 3 is a diagram illustrating session types and relationships in the device.

FIG. 3 is a diagram illustrating session types and relationships in the device 1. In one embodiment, the session types include an audio session, a speech session, a radio session, a tone session, and a voice session. The relationships among the sessions include exclusive and coexistent.

Figure 4:
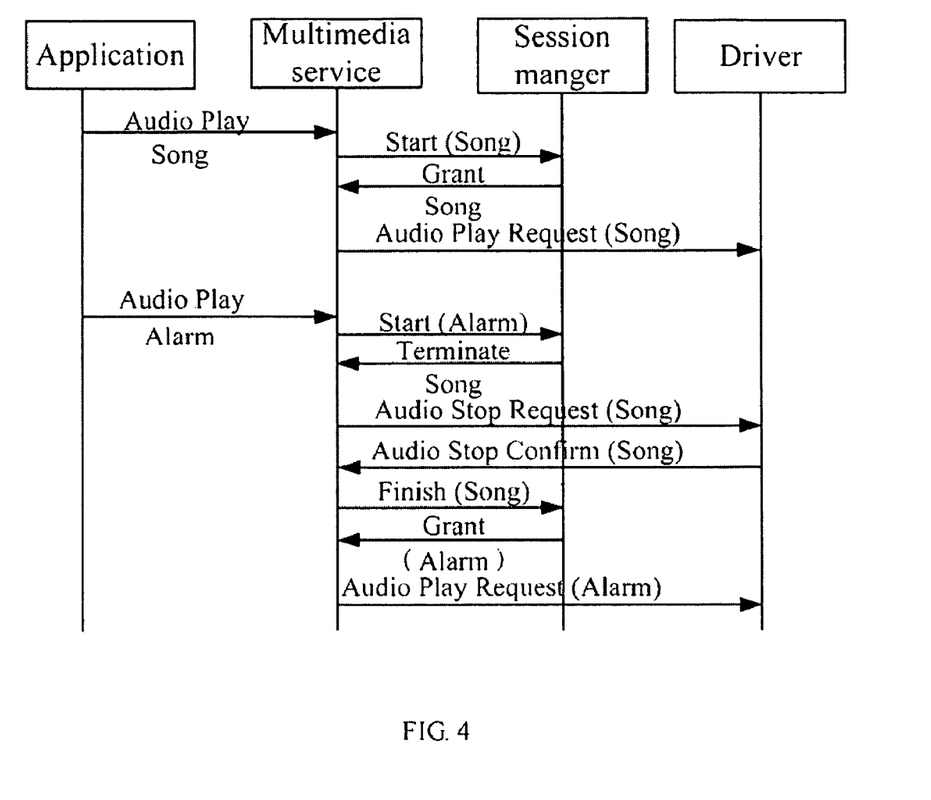
FIG. 4, FIG. 5, and FIG. 6 are flowcharts illustrating a session manager interacting with the services.

Sessions of the same type have an exclusive relationship because they need the use of a same driver at the same time and so must share the driver according to predetermined priorities. For example, referring to FIG. 4, two audio sessions, have an exclusive relationship because they each need the exclusive use of a same speaker. Therefore, when a song and an alarm take place at the same time, they must alternately use the speaker according to the predetermined priorities.

Figure 5:
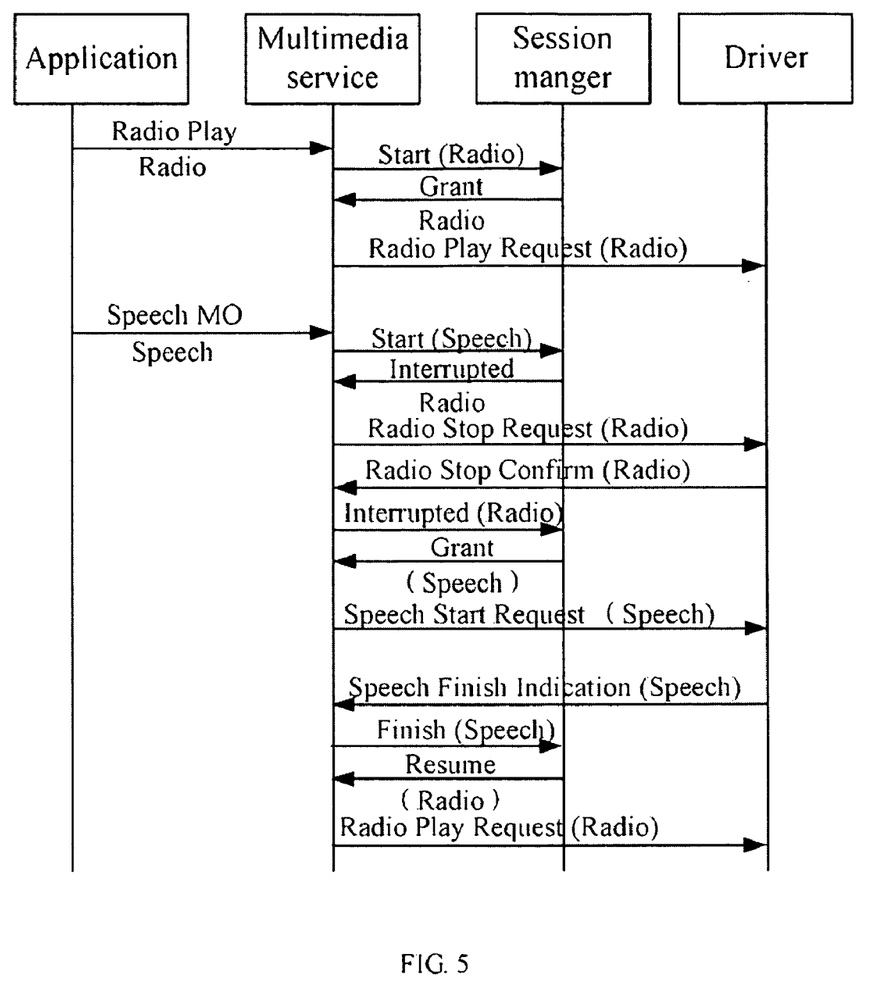

Sessions that take place at the same time but are of different types may have an exclusive relationship or a coexistent relationship. For example, referring to FIG. 5, the radio session and the speech session, have an exclusive relationship because they use different drivers but require exclusive use of same hardware such as the speaker.

Figure 6:
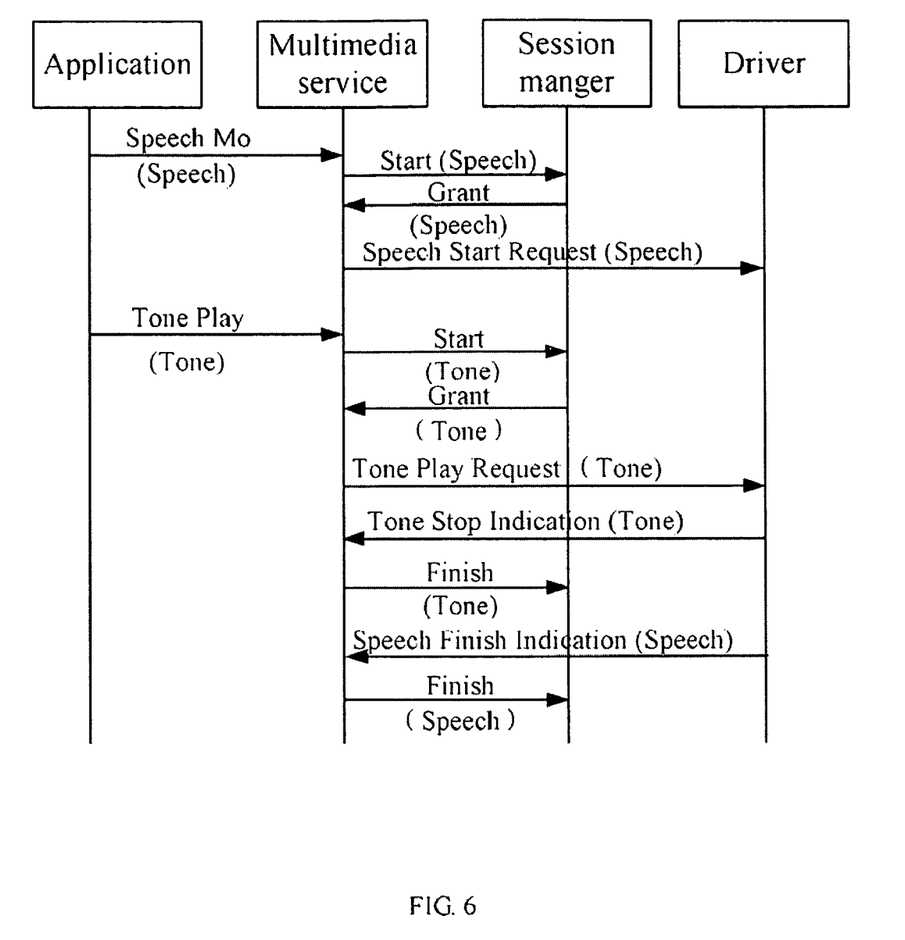

Referring to FIG. 6, the speech session and the tone session are different type sessions, and do not require exclusive use of shared resources and so have a coexistent relationship.

Figure 7:
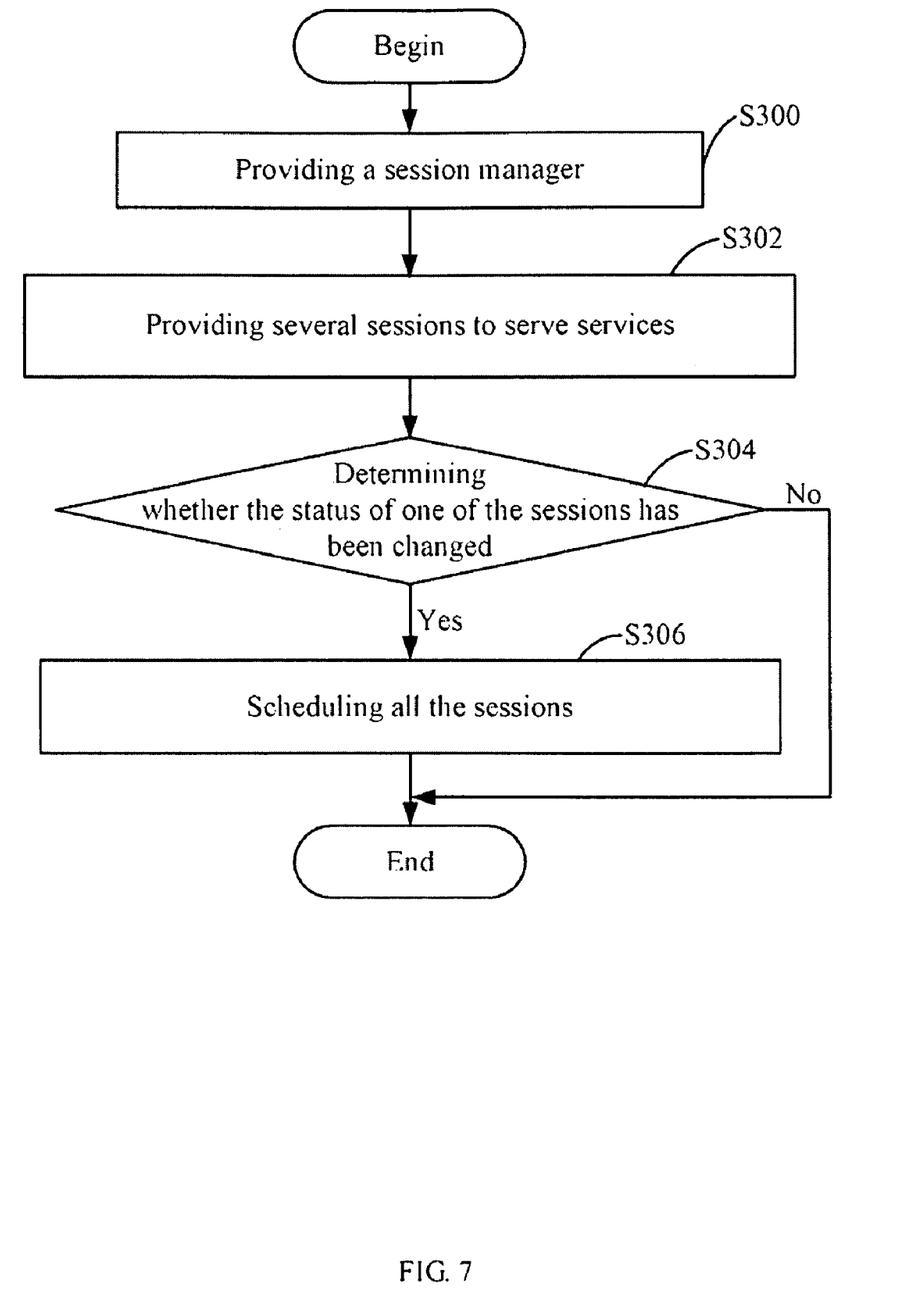
FIG. 7 is a flowchart of one embodiment of a method for scheduling services of the device of FIG. 1 used in sessions.

FIG. 7 is a flowchart of one embodiment of a method for scheduling sessions of the device 1. In block S300, the device 1 provides a session manager 122 in the multimedia manager 12. In block S302, the session manager 122 may provide several sessions to serve the services 120. In block S304, the session manager 122 determines whether the status of one of the sessions has been changed by a service via the functions. In block S306, the session manager 122 schedules all the sessions according to the predetermined priorities of the sessions and the relationship among different types of the sessions if the status of one of the sessions has been changed by one of the services 120. The session manager 122 calls a corresponding callback to notify a corresponding service from the services 120 when the session manager 122 has scheduled one of the sessions.

Figure 8A:
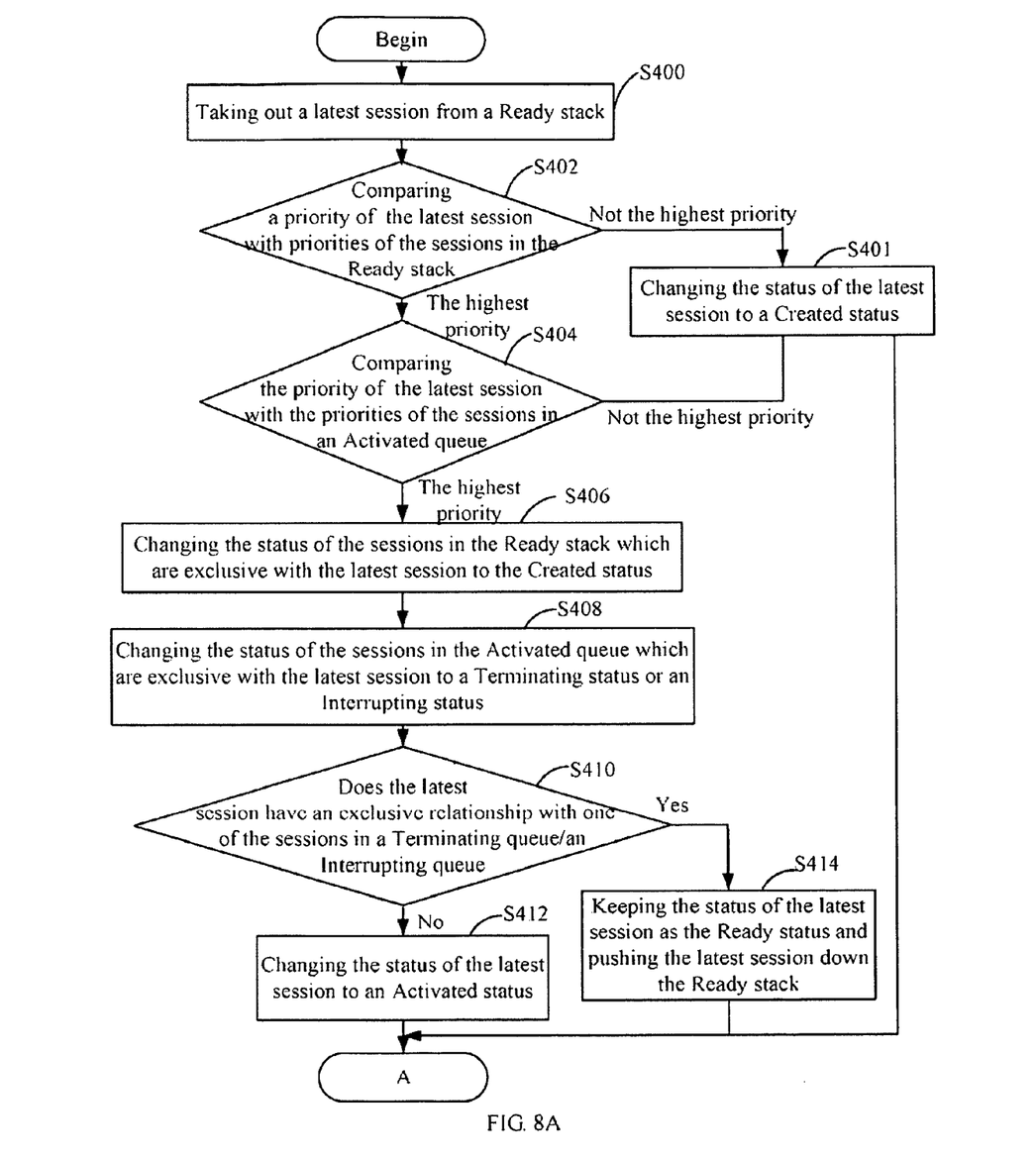
FIGS. 8A-8B are flowcharts illustrating an example of scheduling sessions of the block S306 of FIG. 7.
Figure 8B:
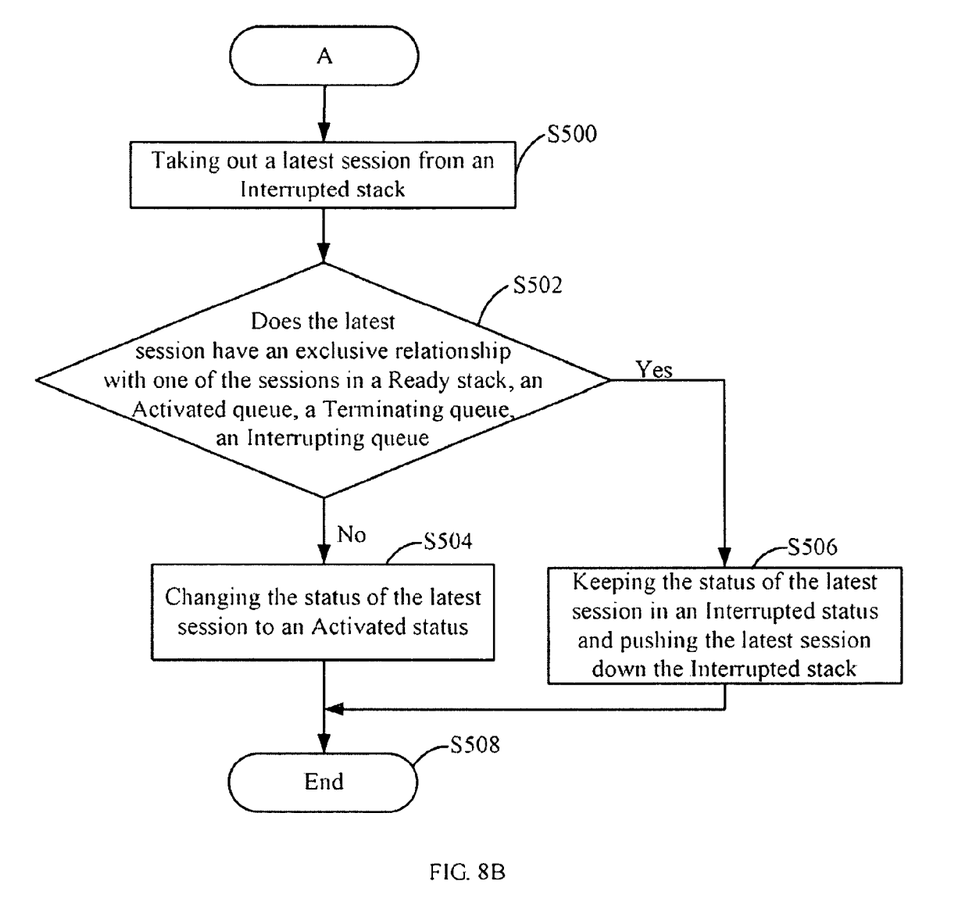

FIGS. 8A-8B are flowcharts illustrating an example of scheduling sessions of the block S306 of FIG. 7. In operation, if a service has changed the status of one of the sessions by a function, the session manager 122 will be triggered to schedule all the sessions. In block S400, the session manager 122 takes out a latest session from the Ready stack and extracts one or more pertinent properties from the session, such as the session type, and the priority. In block S402, the session manager 122 compares the priority of the latest session with the priorities of the sessions which have the exclusive relationships with the latest session in the Ready stack according to the one or more pertinent properties of the sessions. If the latest session and one of the sessions in the Ready stack have a coexistent relationship, the priority of the session is not compared with the priority of the latest session. The procedure goes to block S404 if the priority of the latest session is the highest priority among the sessions in the Ready stack. The procedure goes to block S401 if the priority of the latest session is not the highest priority among the sessions in the Ready stack.

In block S404, the session manager 122 compares the priority of the latest session with the priorities of the sessions which have an exclusive relationship with the latest session in the Activated queue according to the one or more pertinent properties of the sessions. If the latest session and one of the sessions in the Activated queue have a coexistent relationship, the priority of the session is not compared with the priority of the latest session The procedure goes to block S406 if the priority of the latest session is the highest priority among the sessions in the Activated queue. The procedure goes to block S401 if the priority of the latest session is not the highest priority among the sessions in the Activated queue.

In block S401, the session manager 122 changes the status of the latest session to the Created status, and calls the Reject callback to notify a corresponding service 120, the procedure goes to block S500.

In block S406, in the Ready stack, the session manager 122 changes the statuses of the sessions having the exclusive relationships with the latest session to the Created status, and calls the Reject callback to notify the corresponding service 120.

In block S408, in the Activated queue, the session manager 122 changes the status of the sessions which have the exclusive relationships with the latest session to the Terminating status, or the Interrupting status, and calls the Terminate callback or the Interrupt callback to notify the corresponding services 120.

In block S410, the session manager 122 determines whether the latest session has an exclusive relationship with one of the sessions in the Terminating queue or the Interrupting queue. The procedure goes to block S414 if the latest session has an exclusive relationship with one of the sessions in the Terminating queue or the interrupting queue. The procedure goes to block S412 if the latest session has not an exclusive relationship with one of the sessions in the Terminating queue or the Interrupting queue.

In block S412, the session manager 122 changes the status of the latest session to the Activated status, and calls the Grant callback to notify the corresponding service 120, then the procedure goes to block S500.

In block S414, the session manager 122 keeps the status of the latest session in the Ready status and pushes the latest session down the Ready stack, then the procedure goes to block S500.

In block S500, the session manager 122 takes out a latest session from the Interrupted stack. In block S502, the session manager 122 determines whether the latest sessions has an exclusive relationship with one of the sessions in the Ready stack, the Activated queue, the Terminating queue, or the Interrupting queue. The procedure goes to block S506 if the latest session has an exclusive relationship with one of the sessions in the Ready stack, the Activated queue, the Terminating queue, or the Interrupting queue. The procedure goes to block S504 if the latest session has not n exclusive relationship with one of the sessions in the Ready stack, the Activated queue, the Terminating queue, or the Interrupting queue.

In block S504, the session manager 122 changes the status of the latest session to the Activated status, and calls the Resume callback to notify a corresponding service 120.

In block S506, the session manager 122 keeps the status of the latest session in the Interrupted status and pushes the latest session down the Interrupted stack.

In another embodiment, the scheduling sessions of the block S306 of FIG. 7 may begin from the block S500 to block S508 of FIG. 8B, and follow the block S400 to block A of FIG. 8A.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A portable electronic device comprising:
   a storage system;
   at least one processor; and
   a session manager, stored in the storage system and configured to be executed by the at least one processor, the session manager providing one or more different types of sessions between multimedia services and multimedia drivers in the portable electronic device, each of the one or more different types of sessions comprises one or more statuses directed at controlling allotment of the multimedia services to applications of the portable electronic device, wherein the sessions having an exclusive relationship use a corresponding multimedia driver at the same time according to predetermined priorities of the sessions, and the sessions having a coexistent relationship use a corresponding multimedia driver at the same time;
   the session manager further coordinating the statuses of the one or more different types of sessions if a corresponding multimedia service has modified a status of a corresponding session;
   and the session manager further providing callbacks to notify the corresponding multimedia service when the status of the corresponding session has been coordinated by the session manager;
   wherein the one or more statuses of a session comprise a created status, an activated status, a ready status, a terminating status, an interrupting status, and an Interrupted status; and
   properties of the one or more different types of sessions comprise an identification, a priority, a status, and a callback.

2. A method for scheduling sessions in a portable electronic device, the method comprising:
   providing one or more different types of sessions between multimedia services and multimedia drivers in the portable electronic device, each of the one or more different types of sessions comprises one or more statuses directed at controlling allotment of the multimedia services to applications of the portable electronic device, wherein the sessions having an exclusive relationship use a corresponding multimedia driver at the same time according to predetermined priorities of the sessions, and the sessions having a coexistent relationship use a corresponding multimedia driver at the same time;
   coordinating the statuses of the one or more different types of sessions if a corresponding multimedia service has modified a status of a corresponding session; and
   providing callbacks to notify the corresponding multimedia service when the status of the corresponding session has been coordinated by the session manager;
   wherein the one or more statuses of a status of a session comprise a created status, an activated status, a ready status, a terminating status, an interrupting status, and an interrupted status; and
   properties of the one or more different types of sessions comprise an identification, a priority, a status, and a callback.

3. The method according to claim 2, wherein the coordinating step comprises:
   (a1) taking out a latest session from a ready stack which stores the sessions in the ready status;
   (a2) going to step (a3) if the priority of the latest session is not the highest among all the sessions in the ready stack or in an activated queue which stores the sessions in the activated status, or going to step (a4) if the priority of the latest session is the highest among all the sessions in the ready stack and in the activated queue; (a3) changing the status of the latest session to the created status;
   (a4) changing the statuses of the sessions in the ready stack that are exclusive with the latest session to the created status;
   (a5) changing the status of the sessions in the activated queue that are exclusive with the latest session to the terminating status or the interrupting status;
   (a6) going to step (a7) if the latest session has an exclusive relationship with one of the sessions in an terminating queue or in an interrupting queue, and otherwise, going to step (a8), wherein the interrupting queue stores the sessions in the interrupting status and the terminating queue stores the sessions in the terminating status;
   (a7) keeping the status of the latest session in the ready status and pushing the latest session down the ready stack; and
   (a8) changing the status of the latest session to the activated status, inserting the latest session into the activated queue.

4. The method according to claim 3, wherein the coordinating step comprises:
   (b1) taking out a latest session from an interrupted stack which stores the sessions in the interrupted status;
   (b2) going to step (b3) if the latest session has an exclusive relationship with one of the sessions in the ready stack, the activated queue, the terminating queue, or the interrupting queue, otherwise, going to step (b4);
   (b3) keeping the status of the latest session in the interrupted status and pushing the latest session down the interrupted stack; and
   (b4) changing the status of the latest session to the activated status, inserting the latest session into the activated queue.

5. A non-transitory storage medium having stored thereon instructions that, when executed by a processor of a portable electronic device, causes the portable electronic device to perform a method comprising:
   providing one or more different types of sessions between multimedia services and multimedia drivers in the portable electronic device by a session manager stored in a storage system of the portable electronic device, each of the one or more different types of sessions comprises one or more statuses directed at controlling allotment of the multimedia services to applications of the portable electronic device, wherein the sessions having an exclusive relationship use a corresponding multimedia driver at the same time according to predetermined priorities of the sessions, and the sessions having a coexistent relationship use a corresponding multimedia driver at the same time;
   coordinating the statuses of the one or more different types of sessions if a corresponding multimedia service has modified a status of a corresponding session; and
   providing callbacks to notify the corresponding multimedia service when the status of the corresponding session has been coordinated by the session manager;
   wherein the one or more statuses of a status of a session comprise a created status, an activated status, a ready status, a terminating status, an interrupting status, and an interrupted status; and
   properties of the one or more different types of sessions comprise identification, a priority, a status, and a callback.

6. The storage medium according to claim 5, wherein the coordinating step comprises:
- (a1) taking out a latest session from a ready stack which stores the sessions in the ready status;
- (a2) going to step (a3) if the priority of the latest session is not the highest among all the sessions in the ready stack or in an activated queue which stores the sessions in the activated status, or going to step (a4) if the priority of the latest session is the highest among all the sessions in the ready stack and in the activated queue; (a3) changing the status of the latest session to the created status;
- (a4) changing the statuses of the sessions in the ready stack that are exclusive with the latest session to the created status;
- (a5) changing the status of the sessions in the activated queue that are exclusive with the latest session to the terminating status or the interrupting status;
- (a6) going to step (a7) if the latest session has an exclusive relationship with one of the sessions in an terminating queue or in an interrupting queue, and otherwise, going to step (a8), wherein the interrupting queue stores the sessions in the interrupting status and the terminating queue stores the sessions in the terminating status;
- (a7) keeping the status of the latest session in the ready status and pushing the latest session down the ready stack; and
- (a8) changing the status of the latest session to the activated status, inserting the latest session into the activated queue.

7. The storage medium according to claim 6, wherein the coordinating step comprises:
- (b1) taking out a latest session from an interrupted stack which stores the sessions in the interrupted status;
- (b2) going to step (b3) if the latest session has an exclusive relationship with one of the sessions in the ready stack, the activated queue, the terminating queue, or the interrupting queue, otherwise, going to step (b4);
- (b3) keeping the status of the latest session in the interrupted status and pushing the latest session down the interrupted stack; and
- (b4) changing the status of the latest session to the activated status, inserting the latest session into the activated queue.

* * * * *